(12) United States Patent
Faraon et al.

(10) Patent No.: US 11,397,343 B2
(45) Date of Patent: Jul. 26, 2022

(54) MICROWAVE-TO-OPTICAL TRANSDUCER USING MAGNETO-OPTICS AT ZERO APPLIED MAGNETIC FIELD

(71) Applicant: California Institute of Technology, Pasadena, CA (US)

(72) Inventors: Andrei Faraon, Pasadena, CA (US); Jake Rochman, Pasadena, CA (US); Tian Xie, Pasadena, CA (US); John G. Bartholomew, Camperdown (AU)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 55 days.

(21) Appl. No.: 17/116,131

(22) Filed: Dec. 9, 2020

(65) Prior Publication Data
US 2021/0302767 A1 Sep. 30, 2021

Related U.S. Application Data

(60) Provisional application No. 62/946,329, filed on Dec. 10, 2019.

(51) Int. Cl.
*G02F 1/095* (2006.01)
*G02F 1/00* (2006.01)

(52) U.S. Cl.
CPC ............ *G02F 1/095* (2013.01); *G02F 1/0036* (2013.01)

(58) Field of Classification Search
CPC ................................ G02F 1/095; G02F 1/0036
See application file for complete search history.

(56) References Cited

U.S. PATENT DOCUMENTS

2021/0028863 A1    1/2021  Faraon et al.

OTHER PUBLICATIONS

Jacob P. Covey, Alp Sipahigil, and Mark Saffman, "Microwave-to-optical conversion via four-wave mixing in a cold ytterbium ensemble", Jul. 8, 2019, Physical Review A 100, 012307 (2019), pp. 1-9 (Year: 2019).*

(Continued)

*Primary Examiner* — Eric Wong
*Assistant Examiner* — Mary A El-Shammaa
(74) *Attorney, Agent, or Firm* — Steinfl + Bruno, LLP

(57) ABSTRACT

Systems and methods for providing a microwave-to-optical (M2O) transducer using magneto-optical field interactions with spin states of an ensemble of ions doped into a crystal structure is presented. According to one aspect, the crystal structure is a ($^{171}Yb^{3+}$:YVO) doped crystal structure that provides a substrate for an on-chip implementation of the transducer. According to one aspect, coupling of microwave and optical signals to the ions is based on respective microwave and optical waveguides fabricated in or on the doped crystal structure. According to another aspect, coupling of microwave and optical signals to the ions is based on respective microwave and optical resonant cavities fabricated in or on the doped crystal structure. Transduction can be based on either a three-level system with near-zero applied external magnetic field or on a four-level system with zero applied external magnetic field. The transducer can operate reversibly as an optical-to-microwave (O2M) transducer.

21 Claims, 9 Drawing Sheets

(56) References Cited

OTHER PUBLICATIONS

A. Ortu et al., "Simultaneous coherence enhancement of optical and microwave transitions in solid-state electronic spins,"Nature Materials 17, 671-675 (2018).
Abobeih M. H. et al., "One-second coherence for a single electron spin coupled to a multi-qubit nuclear-spin environment." Nat. Commun. 9, 1-8 (2018).
Awschalom D. D. et al., "Quantum technologies with optically interfaced solid-state spins." Nat. Photonics. 12, 516-527 (2018).
B. Car et al., "Selective Optical Addressing of Nuclear Spins through Superhyperfine Interaction in Rare-Earth Doped Solids," Physical Review Letters 120, 1-6 (2018).
Bartholomew et al., "ON-chip coherent microwave-to-optical transduction mediated by ytterbium in YVO4" Published in Nature Comm, 11:3266, 2020. + Supplementary Info. 24 Pages.
Bartholomew et al., "ON-chip coherent microwave-to-optical transduction mediated by ytterbium in YVO4" *Institute for Quantum Information and Matter,* 33 pages.
Bernien H. et al., "Heralded entanglement between solid-state qubits separated by three metres." Nature. 497, 86-90 (2013).
Clark R. "Quantum Frequency Conversion for Ytterbium Ion Based Quantum Repeaters" Department of Electrical and Computer Engineering, 2012, 55 pages.
Covey J. P. et al., "Telecom-band quantum optics with ytterbium atoms and silicon nanophotonics" Phys. Rev., Oct. 2018, 12 pages.
Ł. Cywiński et al., "How to enhance dephasing time in superconducting qubits," Physical Review B—Condensed Matter and Materials Physics 77, 1-11 (2008).
D. L. McAuslan et al., "Reducing decoherence in optical and spin transitions in rare-earth-metal-ion-doped materials," Physical Review A 85, 032339 (2012).
De Lange G. et al., "Universal Dynamical Decoupling of a single solid-state spin from spin bath" Science. 330, 60-64 (2010).
Dibos A. M. et al., "Atomic source of single photons in the telecom band" Phys. Rev. Lett. 120, 243601 (2018).
E. Z. Cruzeiro et al., "Spectral hole lifetimes and spin population relaxation dynamics in neodymiumdoped yttrium orthosilicate," Physical Review B 95, 205119 (2017).
F. Marsili et al., "Detecting single infrared photons with 93% system efficiency," Nature Photonics 7, 210-214 (2013).
G. Sallen et al., "Subnanosecond spectral diffusion measurement using photon correlation," Nature Photonics 4, 696-699 (2010).
Harvey-Collard P. "High-fidelity single-shot readout for a spin qubit via an enhanced latching mechanism" *Phys. Rev.,*Dec. 2017, 15 pages.
Hensen B. et al., "Loophole-free Bell in equality violation using electron spins separated by 1.3 kilometers." Nature. 526, 682-686 (2015).
Hopper D. A. et al., "Spin Readout Techniques of the Nitrogen-Vacancy Center in Diamond" Micromachines, Aug. 2018, 30 pages.
Humphreys P. C. et al., "Deterministic delivery of remote entanglement on a quantum network." Nature. 558, 268-273 (2018).
J. M. Kindem et al., "Characterization of 171 Yb 3 + : YVO 4 for photonic quantum technologies," Phys. Rev. B 80, 1-10 (2018).
J. Medford et al., "Scaling of Dynamical Decoupling for Spin Qubits," Physical Review Letters 108, 086802 (2012).
Keith D. et al. "Benchmarking high fidelity single-shot read out of semiconductor qubits" New Journal of Physics, Jun. 2019, 19 pages.
Kimble H. J. "The quantum internet" Nature. 453, 1023-1030 (2008).
Klauder J. R. et al., "Spectral diffusion decay in spin resonance experiments." Phys Rev. 125 (1961).
Koehl W. F. et al., "Room temperature coherent control of defect spin qubits in silicon carbide" Nature. 479, p. 84, (2011).
Kolesov R. et al., "Optical detection of a single rare-earth ion in a crystal." Nat. Commun. 3. 1029 (2012).
L. Robledo et al., "Control and Coherence of the Optical Transition of Single Nitrogen Vacancy Centers in Diamond," Physical Review Letters 177403, 1-4 (2010).

Mallet F. "Single-shot qubit readout in circuit quantum electrodynamics" Nature Physics, Sep. 2009, 5 pages.
N. Zhao et al., "Sensing single remote nuclear spins," Nature Nanotechnology 7, 657-662 (2012).
Purcell E. M. et al., "Spontaneous emission probabilities at radio frequencies." Phys. Rev. 69, 681 (1946).
R. M. Macfarlane, "Optical Stark spectroscopy of solids," Journal of Luminescence 125, 156-174 (2007).
Reiserer A. et al., "Cavity-based quantum networks with single atoms and optical photons" Reviews of Modern Physics, vol. 87, Dec. 2015, 40 pages.
S. C. Kitson et al., "Intensity fluctuation spectroscopy of small numbers of dye molecules in a micro cavity," Physical Review A—Atomic, Molecular, and Optical Physics 58, 620-627 (1998).
S. Kolkowitz et al., "Sensing distant nuclear spins with a single electron spin," Physical Review Letters 109, 1-5 (2012).
S. Meiboom et al., "Modified Spin Echo Method for Measuring Nuclear Relaxation Times,", 688 (1958).
S. Mosor et al., "Scanning a photonic crystal slab nanocavity by condensation of xenon," Applied Physics Letter 87, 10-13 (2005).
S. Welinski et al., "Effects of disorder on optical and electron spin linewidths in Er 3+ ,Sc 3+ :Y 2 SiO 5," Optical Materials 63, 69-75 (2017).
Sipahigil A. et al., "An integrated diamond nanophotonics platform for quantum-optical networks." Science, 354, 847-850 (2016).
Sukachev D. D. et al., "Silicon-Vacancy Spin Qubit in Diamond: A Quantum Memory Exceeding 10 ms with Single-Shot State Readout." 223602, 1-6 (2017).
Sun. S. et al., "A single-photon switch and transistor enabled by a solid-state quantum memory" Science, 361, 57-60 (2018).
Suter D. et al., "Protecting quantum information against environmental noise" Rev. Mod. Phys. 88, 1-10 (2018).
T. Böttger et al., "Optical decoherence and spectral diffusion at 1.5 µm in Er3+: Y2 SiO5 versus magnetic field, temperature, and Er3+ concentration," Physical Review B 73, 075101 (2006).
T. G. Tiecke et al., "Nanophotonic quantum phase switch with a single atom," Nature 508, 241-244 (2014).
T. Gullion et al., "New, compensated Carr-Purcell sequences," Journal of Magnetic Resonance (1969) 89, 479-484 (1990).
T. H. Taminiau et al., "Detection and Control of Individual Nuclear Spins Using a Weakly Coupled Electron Spin," Physical Review Letters 109, 137602 (2012).
T. Zhong et al., "High quality factor nano photonic resonators in bulk rare-earth doped crystals," Optics Express 24, 536 (2016).
U. Ranon, "Paramagnetic resonance of Nd3+, Dy3+, Er3+ and Yb3+ in YVO4," Physics Letters A 28, 228-229 (1968).
Utikal T. et al., "Spectroscopic detection and state preparation of a single praseodymium ion in a crystal." Nat. Commun. 5, 3627 (2014).
V. V. Dobrovitski et al., "Decay of Rabi oscillations by dipolar-coupled dynamical spin environments," Physical Review Letters 102, 1-4 (2009).
Wehner S. et al., "Quantum internet: A vision for the road ahead." Science, 362 (2018).
Wesenberg J. H. et al., "Scalable designs for quantum computing with rare-earth-ion-doped crystals" Physical Review, vol. 75, Jan. 2007, 7 pages.
Williamson L. A. et al., "Magneto-Optic modulator with unit quantum efficiency." Phys. Rev. Lett. 113, 203601 (2014).
Zhong M. et al., "Optically addressable nuclear spins in a solid with a six-hour coherence time." Nature. 517, 177-180 (2015).
Zhong M. et al., "Quantum information processing using frozen core Y3+ spins in Eu3+: Y2 SiO5." New J. Phys. 21, 033019 (2019).
Zhong T. et al., "Nanophotonic rare-earth quantum memory with optically controlled retrieval." Science, 357, 1392-1395 (2017).
Zhong T. et al., "Optically addressing single rare-earth ions in a nanophotonic cavity." Phys. Rev. Lett. 121, 183603 (2018).
Ahlefeldt, R. L., et al., "Ligand isotope structure of the optical 7F0→5D0 transition in EuCI3•6H2O,"*Phys. Rev.*B 80,5-9 (Nov. 5, 2009). 6 pages.
Andrews, R. W., et al., "Bidirectional and efficient conversion between microwave and optical light," Nat. Phys. 10, 321-326 (2014). 7 Pages.

(56) References Cited

OTHER PUBLICATIONS

Chen, Y.-H., et al., "Coupling erbium spins to a three-dimensional superconducting cavity at zero magnetic field," *Phys. Rev. B—Condens. Matter Mater. Phys.* 94, 1-5 (2016). 6 Pages.
Cook, E. C., et al., "High passive-stability diode-laser design for use in atomic-physics experiments," Rev. Sci. Instrum 83, 43101 (2012). 11 pages.
Covey, J. P., et al., "Microwave-to-optical conversion via four-wave mixing in a cold ytterbium ensemble," *Phys. Rev.* A100, 012307 (2019). 10 Pages.
Dahmani, Y. D., et al., "Piezo electric Transduction of a wavelength-Scale Mechanical Waveguide," *Phys. Rev. Appl.* 13,024069 (2020). 15 Pages.
Dold, G. et al., "High-Cooperativity Coupling of a Rare-Earth Spin Ensemble to a Superconducting Resonator Using Yttrium Orthosilicate as a substrate," Phys. Rev. Appl. 10, 54082 (2019). 7 Pages.
Dung, H. T., et al., "Local-field correction to the spontaneous decay rate of atoms embedded in bodies of finite size," *Phys. Rev. A* 74,023803 (2006). 12 Pages.
Erickson, L. E., et al., "Nuclear quadrupole resonance measurements of the anisotropic magnetic shielding and quadrupole coupling constants of 151Eu3' and 153Eu3' dilute in YAIO3 single Crystal," *Phys.Rev.*B 24,3697-3700 (Oct. 1, 1981). 5 Pages.
Fan, L. et al., "Superconducting cavity electro-optics: A platform for coherent photon conversion between superconducting and photonic circuits," *Sci. Adv.* 4, eaar4994 (2018). 7 pages.
Fernandez-Gonzalvo, X., et al., "Cavity enhanced Raman heterodyne spectroscopy in Er 3+:Y2SiO5 for microwave to optical signal conversion," arXiv:1712.07735v1 (Dec. 22, 2017). 7 Pages.
Fernandez-Gonzalvo, X., et al., "Cavity enhanced Raman heterodyne spectroscopy in Er3+:Y2SiO5 for microwave to optical signal conversion," *CLEO Pacific Rim*, 2018. 3 Pages.
Fernandez-Gonzalvo, X. et al., "Coherent Frequency Conversion from microwave to Optical Fields in an Erbium Doped Y2SiO5 Crystal: Towards the SinglePhoton Regime," Dissertation presented to the University of Otago, Department of Physics, Feb. 2017. 180 Pages.
Fernandez-Gonzalvo, X., et al., "Coherent frequency up-conversion of microwaves to the optical telecommunications band in an Er:YSO crystal," *Phys. Rev. A* 92, 062313(2015). 8 Pages.
Güindoğan, M., et al., "Solid State Spin-Wave Quantum Memory for Time-Bin Qubits," Physical Review Letters 114, 230501(2015). 6 Pages.
Hedges, M. P., et al., "Efficient quantum memory for light," Nature 465,1052-1056. Jun. 24, 2010. 6 Pages.
Higginbotham, A. P., et al. "Harnessing electro-optic correlations in an efficient mechanical converter," *Nat. Phys.* 14, 1038-1042 (Oct. 2018). 7 Pages.
Hisatomi, R. et al., "Bidirectional conversion between microwave and light via ferromagnetic Magnons," Phys.Rev. B93, 174427 (2016). 14 Pages.
Jobez, P. et al., "Coherent Spin Control at the Quantum Level in an Ensemble-Based Optical Memory," *Phys. Rev. Lett.* 114, 230502 (Jun. 15, 2015). 6 Pages.
Kindem, J. M., et al., "Coherent control and single-shot readout of a rare-earth ion embedded in a nanophotonic cavity," + Supplementary Materials. Arxiv Prepr. arXiv1907.12161(2019). 37 pages.
Lambert, N. J., et al., "Coherent Conversion Between Microwave and Optical Photons—An Overview of Physical Implementations," Adv. Quantum Technol. 3,1900077 (2020). 16 Pages.
Lauk, N. et al., "Perspectives on quantum transduction," QuantumSci. Technol. 5, 020501 (2020). 16 Pages.
Ledingham, P. M., et al., "Experimental Realization of Light with Time-Separated Correlations by Rephasing Amplified Spontaneous Emission," *Phys. Rev. Lett.* 109,093602 (Aug. 31, 2012). 6 Pages.
O'Brien, C., et al., "Interfacing superconducting qubits and telecom photons via a rare-earth-doped crystal," Phys. Rev. Lett. 113, 1-5, (2014). 6 pages.
Rueda, A., et al., "Efficient microwave to optical photon conversion: an electro-optical realization," *Optica* 3, 597 (2016). 9 Pages.
Schuurmans, F. J.P., et al., "Local-field effects on spontaneous emission of impurity atoms in homogeneous dielectrics," Phys. Lett. A 264,472-477 (Jan. 10, 2000). 7 Pages.
Tiranov, A. et al., "Spectroscopic study of hyperfine properties in 171Yb3+:Y2SiO5," Phys. Rev.B 98, 195110 (Nov. 8, 2018). 13 Pages.
Vainsencher, A., et al., "Bi-directional conversion between microwave and optical frequencies in a piezoelectric optomechanical device," Appl. Phys. Lett. 109, 033107 (Jul. 20, 2016). 6 Pages.
Welinski, S. et al., "Electron Spin Coherence in Rare-Earth Optically Excited States for Microwave to Optical Quantum Transducers," Phys. Rev.Lett. 122, 247401 (2018). 7 Pages.
Yamaguchi, M., et al., "Mapping of site distribution in Eu3+: YAIO3 on RF-optical frequency axes by using double-resonance spectroscopy," *J. Lumin.* 76,681-684 (1998). 5 Pages.

\* cited by examiner

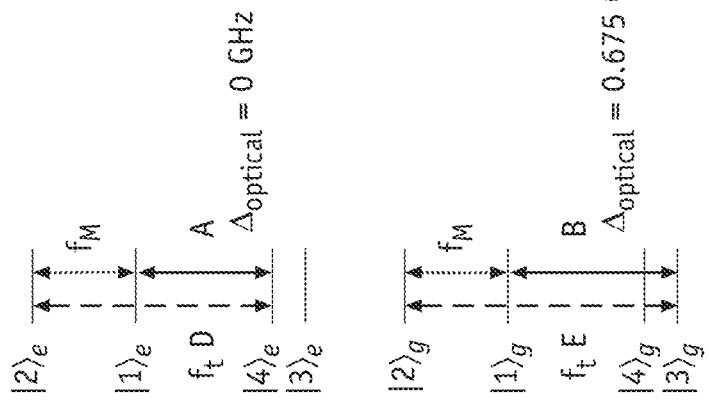
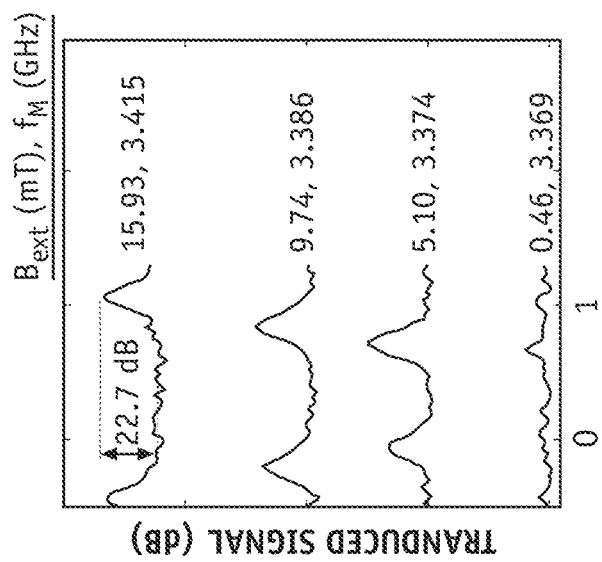
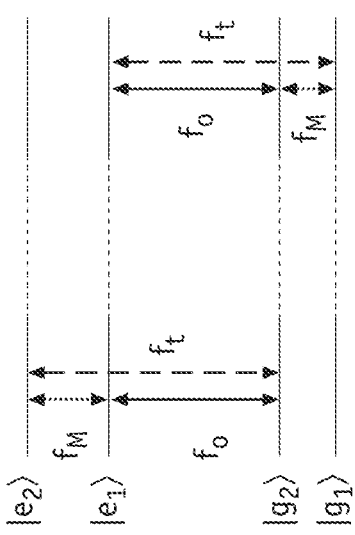
FIG. 5A
FIG. 5B
FIG. 5C

MICROWAVE-TO-OPTICAL TRANSDUCER USING MAGNETO-OPTICS AT ZERO APPLIED MAGNETIC FIELD

CROSS REFERENCE TO RELATED APPLICATIONS

The present application claims priority to and the benefit of U.S. provisional patent application Ser. No. 62/946,329 entitled "On-Chip Coherent Microwave-To-Optical Transducers Mediated By Ytterbium In Crystals", filed on Dec. 10, 2019, the disclosure of which is incorporated herein by reference in its entirety.

STATEMENT OF GOVERNMENT GRANT

This invention was made with government support under Grant No. FA9550-18-1-0374 awarded by the Air Force and under Grant No(s). N00014-16-1-2676 and N00014-19-1-2182 awarded by the Office of Naval Research. The government has certain rights in the invention.

TECHNICAL FIELD

The present disclosure relates to systems and methods for providing a microwave-to-optical (M2O) transducer using a magneto-optic interaction. In particular, transduction provided by the present transducer may be based on the magneto-optic interaction with an ensemble of trivalent ytterbium-171 ($^{171}YB^{3+}$) ions that are doped into a crystal structure, such as an yttrium orthovanadate (YVO) crystal structure ($^{171}Yb^{3+}$:YVO), and operable at zero applied (external) magnetic field.

BACKGROUND

Optical networks, that distribute entanglement among various quantum computers, will form the backbone for the quantum internet (e.g., Ref. [1]) but are yet to interface with leading quantum hardware such as superconducting qubits used in superconducting quantum computers. Consequently, such superconducting quantum computers remain isolated in real life implementations mainly because microwave links that are used in the generation of the qubits are noisy and lossy at room temperature. Building optical connections between microwave quantum systems (computers) requires interfaces, such as transducers, that reversibly map quantum information of the qubits between microwave and optical fields.

While preliminary microwave-to-optical (M2O) transducers have been realized (e.g., Refs. [6, 7]), developing efficient, low-noise devices that match superconducting qubit (microwave) frequencies (gigahertz) and bandwidths (10 kHz-1 MHz) remains a challenge. Rare-earth ion (REI) ensembles simultaneously coupled to optical and microwave resonators have been proposed for M2O transducers that could achieve an efficiency and bandwidth to challenge other leading protocols (e.g., Refs. [2, 3]). A further advantage of the REI based M2O transducers compared to electro-optical (e.g., Refs. [8, 9]), electro-optomechanical (e.g., Refs. [10, 11]), piezo-optomechanical (e.g., Refs. [12, 13]), and other magneto-optical (e.g., Ref. [14]) schemes is the existing REI infrastructure for building complex quantum-optical networks including sources (e.g., Refs. [5, 15, 16]) and memories (e.g., Refs. [17-19]) for quantum states of light. While REI platforms provide promise for future networks, transducer demonstrations have been limited to relatively high (externally) applied magnetic fields (>100 mT) (e.g., Refs. [20, 21]) and larger size millimeter-scale devices.

To achieve integration with superconducting qubit platforms, it is highly beneficial to extend operation of REI based M2O transducers (e.g., Refs. [2, 3]) to operation at zero magnetic field (e.g., Ref. [22]). Toward this end, the $^{171}Yb3+$ ion is appealing because it exhibits the simplest spin-state structure with gigahertz-frequency hyperfine transitions (e.g., Refs. [4, 23]) at zero and near-zero applied magnetic fields (e.g., see FIG. 4 later described). In addition, the larger size of currently known in the art millimeter-scale REI transducers require high optical pump powers which may pose integration challenges with required cryogenic cooling systems and light-sensitive superconducting circuits (e.g., Ref. [20]).

The REI based M2O transducer according to the present disclosure overcomes the above described challenges by taking advantage of unique properties of the $^{171}Yb^{3+}$ ion, including its simple spin-state structure with gigahertz-frequency hyperfine transitions operable at zero applied magnetic field and therefore under conditions compatible with the superconducting quantum computers. Furthermore, on-chip integration may provide strong optical mode confinement to reduce the required pump power by several orders of magnitude, and miniaturization expedites integration of multiple devices for powerful control of photons at the quantum level.

SUMMARY

According to a first aspect of the present disclosure, a transducer chip is presented, the transducer chip comprising: a substrate made of a doped crystal ($^{171}Yb^{3+}$:YVO) comprising ytterbium 171 ($^{171}Yb^{3+}$) ions doped into a yttrium orthovanadate (YVO) host crystal; an optical structure formed in the substrate; a conductive layer atop the substrate, the conductive layer comprising a microwave structure configured to magnetically couple a microwave signal to the optical structure, wherein: the transducer chip is configured to transduce the microwave signal to an optical signal by optical pumping energy levels of the $^{171}Yb^{3+}$ ions via an optical pump signal input to the optical structure to obtain a transduced optical signal output by the optical structure.

According to a second aspect of the present disclosure, a method for realizing a rare-earth based transducer is presented, the method comprising: providing a substrate made of a doped crystal ($^{171}Yb^{3+}$:YVO) comprising ytterbium 171 ($^{171}Yb^{3+}$) ions doped into a yttrium orthovanadate (YVO) host crystal; fabricating an optical structure in the substrate; applying a conductive layer atop the substrate; and forming a microwave structure in the conductive layer, the microwave structure configured to magnetically couple a microwave signal to the optical structure, wherein: the optical structure comprises an optical coupler at an input end of a longitudinal extension of the optical structure; and a photonic crystal mirror at an opposite end of the longitudinal extension.

Further aspects of the disclosure are shown in the specification, drawings and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure. Same reference designators refer to same features.

FIG. 5A shows energy levels according to two different implementations of a three-level transduction scheme that may be used in the M2O transducer according to the present disclosure.

FIG. 5B shows graphs representative of transduced signals from the M2O transducer according to the present disclosure as a function of an optical pump frequency for zero and near-zero applied magnetic fields.

FIG. 5C shows energy levels of two possible three-level transduction schemes used in the M2O transducer according to the present disclosure at near-zero applied magnetic fields.

DETAILED DESCRIPTION

The M2O transducer according to the present teachings is an REI based transducer that may outperform prior state-of-the-art transducers (e.g., Refs. [2, 3]), and may operate under conditions compatible with superconducting quantum computers: zero applied magnetic field. The M2O transducer according to the present teachings is based on $^{171}Yb^{3+}$ ions doped in an yttrium orthovanadate (YVO) crystal structure (e.g., $^{171}Yb^{3+}$:YVO shown in FIG. 3 later described) that enable on-chip gigahertz-frequency M2O transduction at zero and near-zero applied magnetic field. It should be noted that as used herein, near-zero magnetic field may refer to a magnetic field that is substantially smaller than 100 mT (millitesla), such as, smaller than 50 mT, and preferably smaller than 20 mT, such as, for example, in a range from about 5 mT to about 15 mT. Furthermore, it should be noted that a transducer such as one described in the present disclosure may also be referred to by a person skilled in the art as a modulator.

Figure 1A:
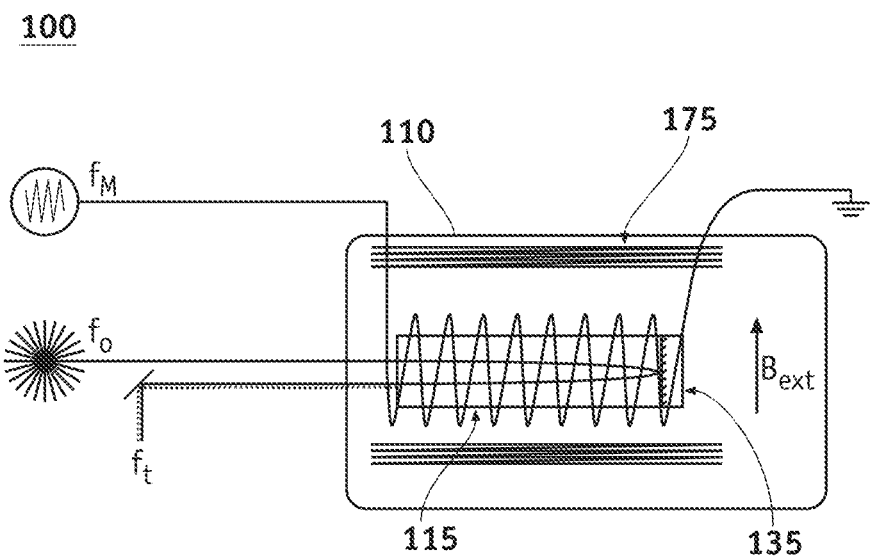
FIG. 1A shows a block diagram of a microwave-to-optical (M2O) transducer according to an exemplary embodiment of the present disclosure including a coplanar microwave waveguide and a nanophotonic waveguide.
Figure 2A:
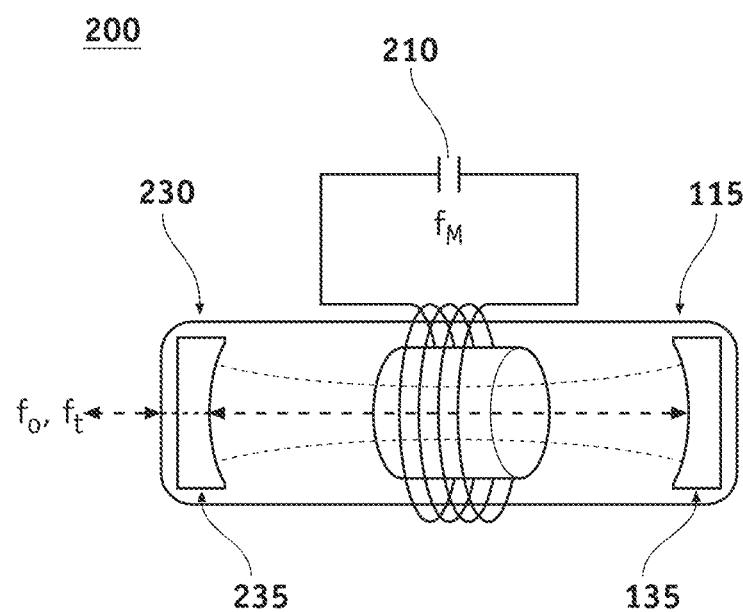
FIG. 2A shows a block diagram of a microwave-to-optical (M2O) transducer according to another exemplary embodiment of the present disclosure including a microwave cavity and an optical cavity.

According to an embodiment of the present disclosure and as shown in FIG. 1A later described, an ensemble of $^{171}Yb^{3+}$ ions of the doped crystal structure ($^{171}Yb^{3+}$:YVO) may be coupled to a microwave signal through a microwave waveguide (e.g., coplanar waveguide, transmission line) and to an optical (light) signal through a nanophotonic waveguide. According to another embodiment of the present disclosure and as shown in FIG. 2A later described, an ensemble of $^{171}Yb^{3+}$ ions of the doped crystal structure ($^{171}Yb^{3+}$:YVO) may be coupled to a microwave signal through a microwave cavity (e.g., resonator) and to an optical signal through an optical cavity. Coupling of the microwave signal to the ensemble of the $^{171}Yb^{3+}$ ions being based on magnetic fields generated by the microwave waveguide or cavity which surround the doped crystal structure ($^{171}Yb^{3+}$:YVO).

Integration of high quality factor microwave and optical cavities (resonators) in the M2O transducer according to the present teachings may in turn enable efficient transduction at zero or near-zero applied magnetic fields, as well as further integration with photonic quantum memories (e.g., Ref. [4]) and $^{171}Yb^{3+}$ ion based single photon sources (e.g., Ref. [5]) to create integrated miniaturized interfaces for hybrid (microwave and optical) quantum networks.

It is noted that operation of the transducer according to the present teachings is reversible, or in other words, either microwave-to-optical (M2O) or optical-to-microwave (O2M) transduction may be possible based on a same device. For compactness, the foregoing description mainly covers M2O operation of the present transducer. A person skilled in the art may clearly use the present teachings to derive O2M operation of the transducer according to the present teachings.

Figure 4:
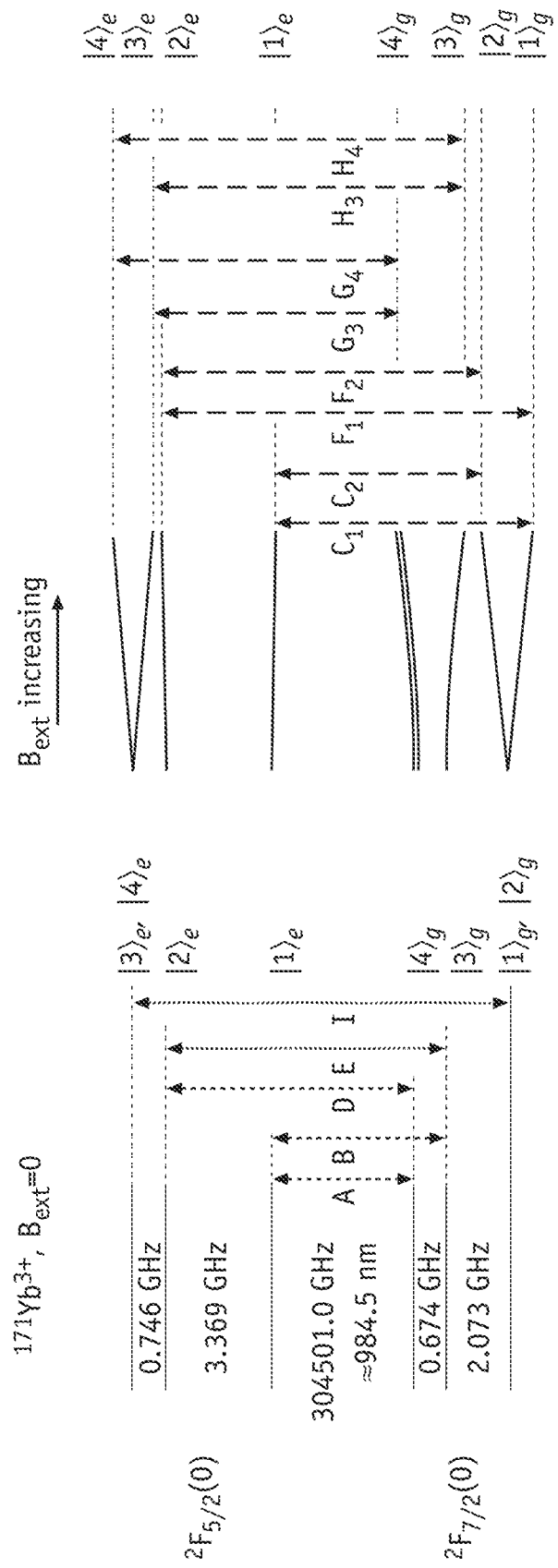
FIG. 4 shows energy level diagram of $^{171}Yb^{3+}$ ions doped into the YVO crystal structure shown in FIG. 3 as function of zero and near-zero applied magnetic fields.

FIG. 1A shows a block diagram of a microwave-to-optical (M2O) transducer (100) according to an exemplary embodiment of the present disclosure that uses $^{171}Yb^{3+}$ ions doped in a crystal structure ($^{171}Yb^{3+}$:YVO, 115) to enable on-chip gigahertz-frequency M2O transduction (and vice versa) at near-zero and zero applied (external) DC magnetic field, $B_{ext}$. In other words, transduction provided by the M2O (100) according to the present disclosure may be performed: i) in the absence of an externally applied magnetic field, $B_{ext}$, and therefore based on energy levels of the $^{171}Yb^{3+}$ ions at zero applied magnetic field, $B_{ext}$, (e.g., as shown in FIG. 4 later described), or ii) in the presence of an externally applied weak (i.e., substantially less than 100 mT) DC magnetic field, $B_{ext}$, and therefore based on energy levels of the $^{171}Yb^{3+}$ ions at near-zero applied field, B, (e.g., as shown in FIG. 4 later described).

With further reference to FIG. 1A, a microwave input signal at a frequency $f_M$, that is magnetically coupled (i.e., through an associated microwave magnetic field) to an ensemble of the $^{171}Yb^{3+}$ ions of the doped crystal structure ($^{171}Yb^{3+}$:YVO, 115) is transduced to an optical signal at a frequency $f_t$, by optical pumping (e.g., optical coupling/excitation such as to affect energy levels of the ions) of the ensemble of the $^{171}Yb^{3+}$ ions via an optical (e.g., laser) input signal at a frequency $f_O$, coupled to the crystal structure (115).

With continued reference to FIG. 1A, cooling of the ($^{171}Yb^{3+}$:YVO) crystal structure (115) while simultaneously coupled to the microwave and optical signals, ($f_M$ and $f_t$), may be provided by a refrigerator (not shown in FIG. 1A) according to techniques known in the art. Furthermore, the external DC magnetic field, $B_{ext}$, may (optionally) be applied to the ($^{171}Yb^{3+}$:YVO) crystal structure (115) via, for example, magnetic field coils (175) that as shown in FIG. 1A are external to (e.g., surround) the ($^{171}$Yb$^{3+}$:YVO) crystal structure (115). It should be noted that reversible operation of the O2M transducer (100) shown in FIG. 1A, therefore O2M transduction, may be provided with two optical inputs at respective frequencies $f_t$ and $f_O$ simultaneously coupled to the device (e.g., through the single entry/exit shown in FIG. 1C), to produce an output microwave signal at the frequency $f_M$.

Figure 1B:
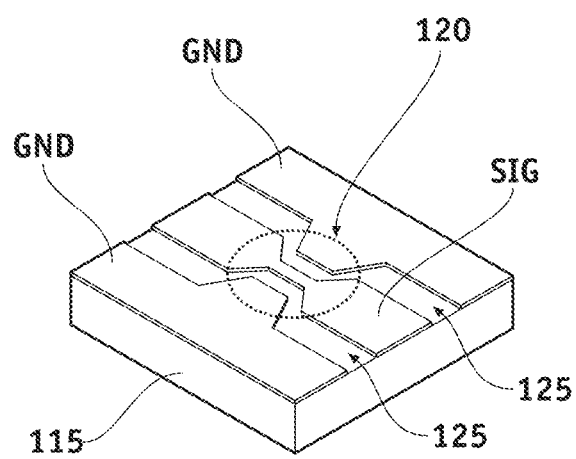
FIG. 1B shows details of an on-chip implementation of the M2O transducer of FIG. 1A including details of the coplanar microwave waveguide.

According to an embodiment of the present disclosure, coupling of the input microwave field (e.g., $f_M$) to the ensemble of the $^{171}$Yb$^{3+}$ ions of the ($^{171}$Yb$^{3+}$:YVO) crystal structure (e.g., 115 of FIG. 1A) may be provided via the coplanar microwave waveguide (110) shown in FIG. 1B. As shown in FIG. 1B, the coplanar microwave waveguide (110) comprises the ($^{171}$Yb$^{3+}$:YVO) crystal structure (115) as a base structure (substrate), and a (conductive) top layer structure including a signal line (e.g., center feedline, SIG) surrounded by a ground plane (GND), the signal line (SIG) and the ground plane (GND) being separated by gaps (125). Furthermore, according to a nonlimiting exemplary embodiment according to the present disclosure, the center feedline (e.g., SIG) may include a constricted region (120) that includes a narrower path for the (microwave) signal (SIG) as well as narrower gaps (125) between the center feedline (SIG) and the ground plane (GND). Geometries of the coplanar microwave waveguide (110) in the constricted region (120), including width of the centerline (SIG) and of the gaps (125), may be made such as to promote a magnetic field in the gaps (125) when a microwave signal (e.g., $f_M$) is coupled to the waveguide according to well known in the art design techniques. According to a nonlimiting exemplary embodiment of the present disclosure, the top layer structure comprising the ground plane (GND) and the signal line (SIG) may be fabricated from a conductive material, such as, for example, gold. A person skilled in the art would realize that other conductive material may be used.

Figure 1C:
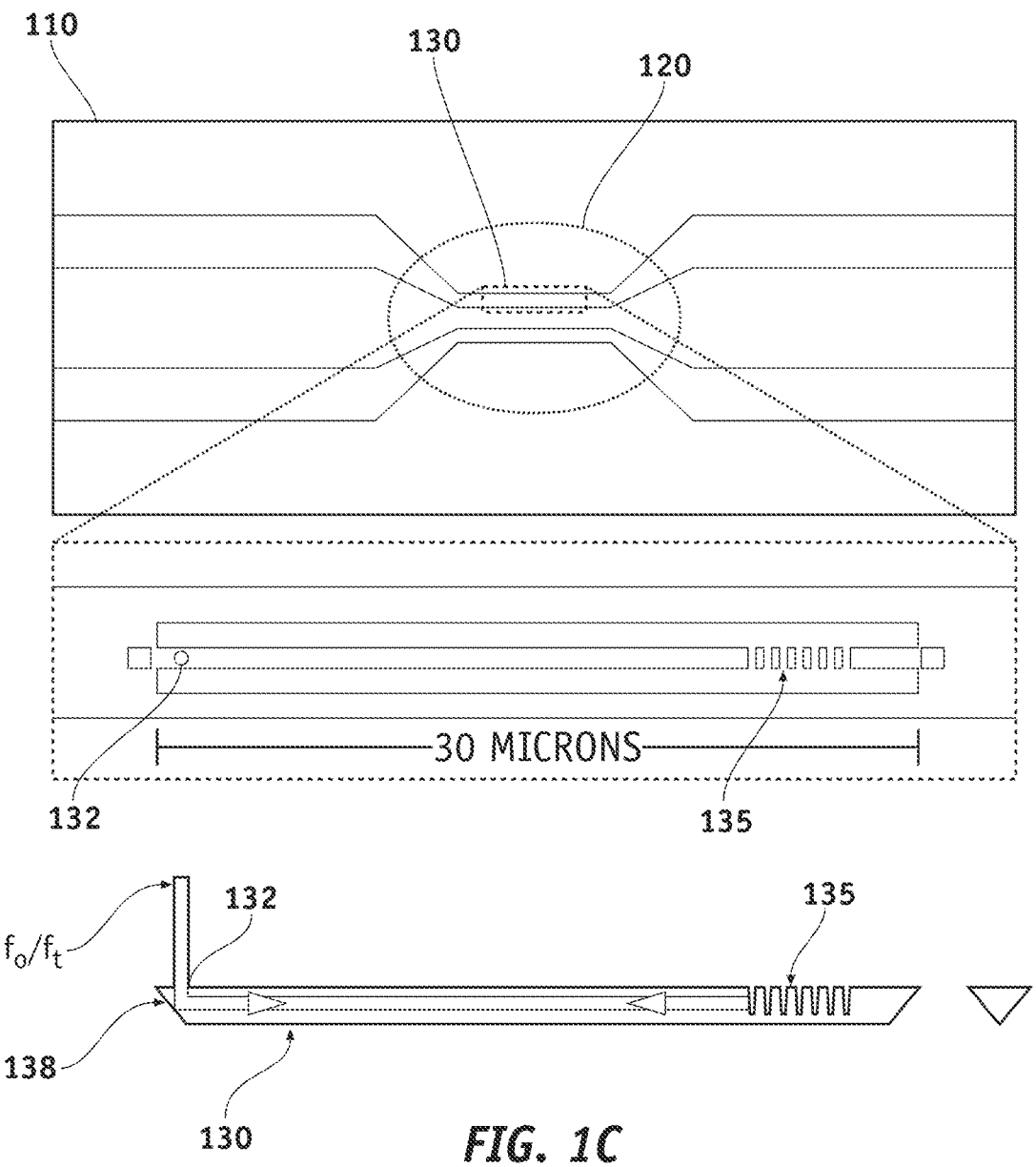
FIG. 1C shows details of the nanophotonic waveguide fabricated within the coplanar microwave waveguide of FIG. 1B.

According to an embodiment of the present disclosure, coupling of the laser/optical input signal (e.g., $f_O$) to the ensemble of the $^{171}$Yb$^{3+}$ ions of the ($^{171}$Yb$^{3+}$:YVO) crystal structure (e.g., 115 of FIG. 1A) may be provided via a (nanophotonic) optical waveguide (e.g., 130 of FIG. 1C) that is fabricated in a region of the crystal structure (115) provided by one of the narrower gaps (125) in the constricted region (120) of the coplanar microwave waveguide (110), as shown in the top down view of FIG. 1C (top portion of the figure while middle portion showing enlarged details). According to a nonlimiting embodiment of the present disclosure, the optical waveguide (130) may be about 30 µm long.

According to an embodiment of the present disclosure, the optical waveguide (130) comprises a photonic crystal mirror (135) that is fabricated on one end of the optical waveguide (130) as shown in the cross section view at the bottom portion of FIG. 1C. Furthermore, as shown in the same cross section view at the bottom portion of FIG. 1C, the optical waveguide (130) comprises an optical coupler (138), such as a 45° optical coupler, at the other end (of the longitudinal extension) of the optical waveguide (130). Accordingly, the combination of the photonic crystal mirror (135) at one end and the optical coupler (138) at the opposite end of the optical waveguide (130), allow optical fields (e.g., laser input $f_O$ of FIG. 1A denoted as Optical beam in FIG. 1C) to be launched (enter the optical waveguide) through the optical coupler (130), reflected by the photonic crystal mirror (135), and collected (exit the optical waveguide) through the same optical coupler (130). The entry to and exit (132) from the optical waveguide (130) is aligned to a free space optical path, for example two lenses that focus the light into an optical fiber (not shown in the figure).

Embodiments of the M2O transducer according to the present disclosure using the microwave and optical waveguides shown in FIGS. 1B and 1C may allow operation/transduction of the transducer over a wide range of microwave and/or optical frequencies, and therefore over different optical and microwave (energy level) transitions provided by the ensemble of the $^{171}$Yb$^{3+}$ ions of the ($^{171}$Yb$^{3+}$:YVO) crystal structure (e.g., 115). According to an embodiment of the present disclosure, and for applications where flexibility in range of microwave/optical frequencies may not be necessary, the M2O transducer according to the present disclosure may alternatively use the microwave and optical cavities (210, 230) shown in FIGS. 2A and 2B instead of the microwave and optical waveguides (e.g., 110, 130) shown in FIGS. 1B and 1C. Such alternative implementation of the M2O transducer according to the present teachings may in turn allow for a more efficient transduction when compared to prior art implementations (e.g., Refs. [20, 21]).

Figure 2B:
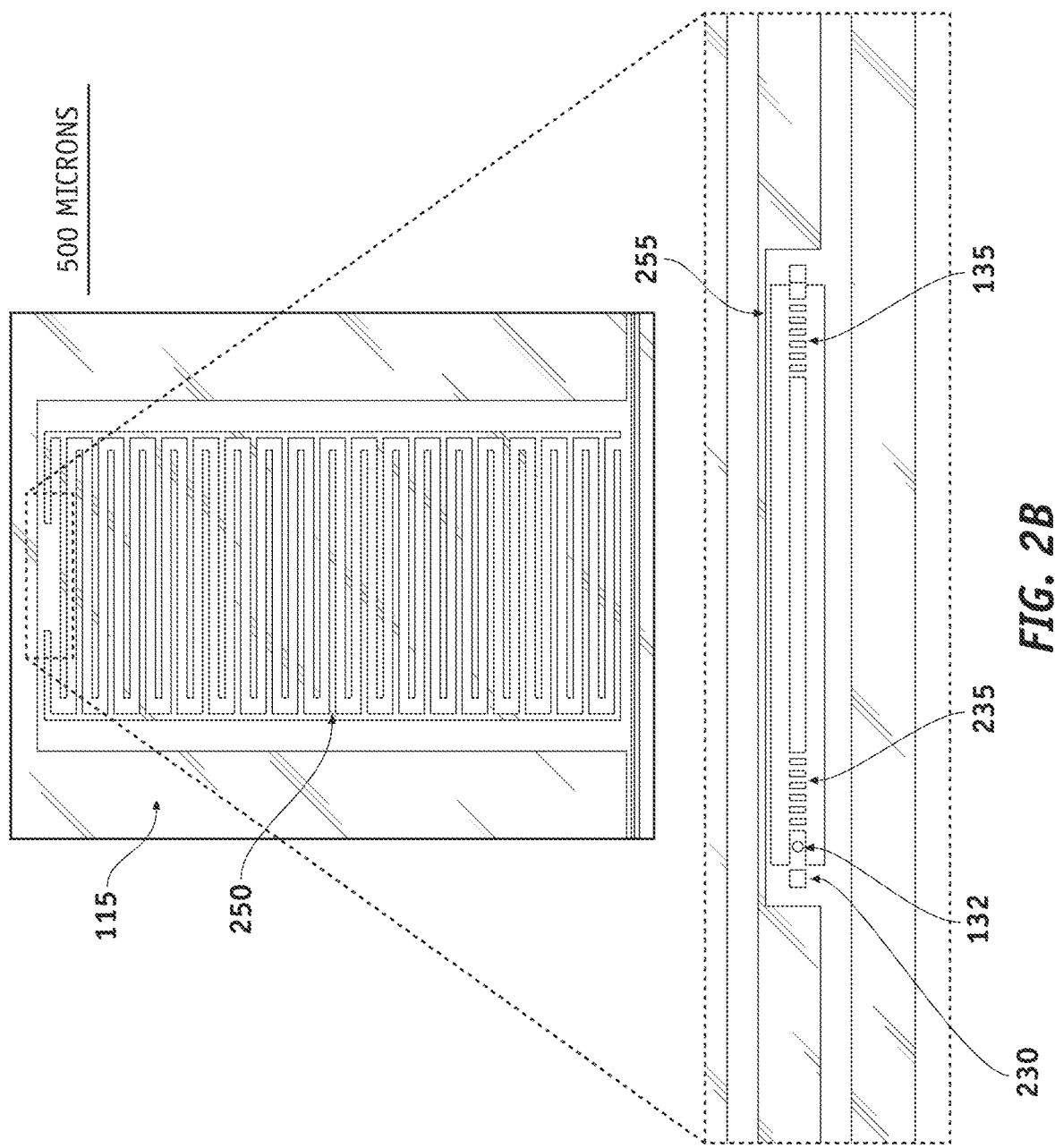
FIG. 2B shows details of an on-chip implementation of the M2O transducer of FIG. 2A including the microwave cavity and the optical cavity.

FIG. 2A shows a block diagram of a microwave-to-optical (M2O) transducer (200) according to another exemplary embodiment of the present disclosure including a microwave cavity (e.g., resonator, 210) and an optical cavity (230), with details of a corresponding on-chip implementation shown in FIG. 2B. In such configuration, microwave (e.g., $f_M$) and optical (e.g., $f_O$) fields are coupled to the ensemble of the $^{171}$Yb$^{3+}$ ions of the ($^{171}$Yb$^{3+}$:YVO) crystal structure (115) using microwave (210) and optical cavities (230) to respectively enhance the magnetic and electric fields that drive the optical and spin transitions of the $^{171}$Yb$^{3+}$ ions. Accordingly, as shown in FIG. 2A, a transduced optical signal (e.g., $f_t$) is output by the optical cavity (230). Furthermore, as shown in FIG. 2A, (spin states of) the $^{171}$Yb$^{3+}$ ions in the optical cavity (230) couple inductively to the microwave cavity (210). Two photonic crystal mirrors, including fully reflective photonic crystal mirror (135) and partially reflective photonic crystal mirror (235), provided at each end of the optical cavity (230), form the cavity mode (e.g., distance from one another).

FIG. 2B shows a top down view of an exemplary implementation according to the present disclosure of the optical cavity (230) and of the microwave cavity (210) of FIG. 2A. The microwave cavity (210), shown in the top portion of FIG. 2B, may be a planar lumped-element microwave resonator (including a capacitor and an inductor as noted in FIG. 2B) made from a patterned conductive layer laid (e.g., 250) over the crystal structure (115). According to an exemplary embodiment of the present disclosure, the conductive layer may be a thin film superconductor having a small enough thickness to reduce (e.g., minimize) losses in the microwave cavity. As shown in FIG. 2B, the conductive layer may include a meandering pattern (250) formed by conductive lines/segments such as in combination, and as known to a person skilled in the art, form a thin planar capacitor and an inductor. Shape of the meandering pattern, including width of the conducting lines and distance/gap between adjacent conductive lines, may be based on a desired resonance mode (e.g., frequency of the microwave signal, $f_M$) of the microwave cavity/resonator. As can be clearly seen in FIG. 2B, the gaps between adjacent conductive lines of the microwave cavity are provided by uncovered portions of the crystal structure (115).

With continued reference to FIG. 2B, the (nanophotonic) optical cavity (230) may be arranged (e.g., fabricated) close to the thin planar inductor (255, thin conductive line adjacent the optical cavity) so to increase (e.g., maximize) the mode overlap between the microwave and optical fields. For example, as shown in the lower portion of FIG. 2B including enlarged details, the optical cavity (230) may be arranged adjacent to the thin conductive line (255) forming the thin planar inductor (microwave cavity). As shown in FIG. 2B, the two photonic crystal mirrors (235, 135) are arranged one at each end of the optical cavity to form the cavity mode. Furthermore, entry of the input optical signal ($f_o$) to the optical cavity (230), and exit of the output transduced optical signal ($f_t$) from the optical cavity (230), may be provided by an optical coupler (not shown in FIG. 2B, similar to one showed in FIG. 1C) at a region (132).

To achieve efficient M2O transduction using REI-doped crystals, it is critical to have an ensemble with low inhomogeneity and a collective cooperativity greater than unity for their optical and microwave transitions (e.g., Ref. [2]). The properties of $^{171}Yb^{3+}$:YVO doped crystal structure used in the M2O transducer according to the present teachings can satisfy both requirements (e.g., Refs. [2, 3]). Significantly, optical transition of the $^{171}Yb^{3+}$ ion near a wavelength of 984.5 nm exhibits a narrow inhomogeneous linewidth ($\Gamma_{ih\ (optical)} \approx 200$ MHz at a doping concentration of approximately 100 ppm), and a large 4f-4f oscillator strength (f=5.3×10$^{-6}$), resulting in a magneto-optic nonlinear coefficient (e.g., $\alpha$ per Table 1 below) that is at least 100× larger than other REI-doped crystals considered to date for transduction.

Using the model developed in Williamson et al. (e.g., Ref. [3]), the efficiency of a three-level (e.g., FIG. 5A later described) transduction process where the ion ensemble is coupled to both a microwave and optical cavity is given by the following equation (1):

$$\eta = \frac{4R^2}{(R^2+1)^2}, \text{ for } R = \frac{2S}{\sqrt{\kappa_o \kappa_m}} \quad (1)$$

The parameter S in equation (1) is the coupling strength between the microwave and optical cavities provided by the magneto-optic nonlinearity of the rare-earth ion ensemble. $\kappa_o$ and $\kappa_m$ are the decay rates of the optical and microwave cavities, respectively. The parameter R in equation (1) is the ratio of the coupling strength to the impedance-matched coupling strength, such that $\eta=1$ when R=1. It is noted that the parameter R can be rewritten (e.g., Ref. [2]) according to the following equation (2):

$$R = \Omega \alpha F \sqrt{Q_o Q_m}, \quad (2)$$

where $\Omega$ is the Rabi frequency of the optical pump, $\alpha$ describes the density and spectroscopic properties of the ion ensemble (magneto-optical nonlinear coefficient), F is an effective filling factor describing the mode overlap of the three fields, and $Q_o$ and $Q_m$ are the quality factors of the one sided optical and microwave resonators, respectively.

Furthermore, it is noted that a significant gain in R can be made by increasing $\alpha$, given (e.g., Ref. [2]) by the following equation (3):

$$\alpha = \sqrt{\frac{\mu_0}{\hbar^2 \epsilon_0}} \mu_{31} \mu_{21} \rho \int_{\epsilon_m}^{\infty} \frac{D_m(\delta_m)}{\delta_m} d\delta_m \int_{\epsilon_o}^{\infty} \frac{D_o(\delta_o)}{\delta_o} d\delta_o, \quad (3)$$

where the parameter $\rho$ is the ion number density. The other parameters in the above equation (3) are as follows: $\mu_0$ is the vacuum permeability, $\hbar$ is the reduced Planck constant, $\epsilon_0$ is the vacuum permittivity, $\mu_{31}$ is the electric dipole moment for the output optical transition, $\mu_{21}$ is the magnetic dipole moment for the input microwave transition, and $D_m(\delta_m)$ and $D_o(\delta_o)$ are the functions describing the inhomogeneous broadening of the spin and optical transitions, respectively, which are assumed to be Gaussian.

Table 1 below compares material spectroscopic properties of the doped crystal structure ($^{171}YB^{3+}$:YVO$_4$) used in the M2O transducer according to the present teachings to a doped crystal ($^{even}Er$:Y$_2$SiO$_5$) (Erbium doped yttrium orthosilicate crystal) used in prior art implementations. As described above, the parameter $\alpha$ is the magneto-optical non-linearity coefficient, which is orders of magnitude larger for ($^{171}Yb^{3+}$:YVO$_4$) compared to ($^{even}Er$:Y$_2$SiO$_5$). The other parameters provided in the table are for reference only and used to calculate $\alpha$. For example, $\rho_{max}$ is the maximum density of spins; $f_{31}$ and $\mu_{31}$ indicate the strength of the optical transitions; $\mu_{12}$ is the strength of the microwave transition; and the $\Gamma_{ih}$ are the frequency widths of the optical and spin transitions. Note: calculating $f_{31}$ and $\mu_{31}$ from the resonant absorption spectrum requires a local field correction (e.g., Refs. [24, 25]). It is noted that both the Virtual (or Lorentz) and Real (or Empty) cavity models/approximations are used in the literature and so Table 1 includes both values for the ($^{171}$Yb:YVO) structure (e.g., Ref. [23]).

TABLE 1

| Parameter | $^{171}$Yb:YVO (86 ppm) | $^{even}$Er:YSO (10 ppm) (Site 1) |
|---|---|---|
| $\alpha$ | 1.6 × 10$^{-8}$ s (Virtual cavity) 2.7 × 10$^{-8}$ s (Real cavity) | 4.8 × 10$^{-11}$ s |
| $\rho_{max}$ (assuming spin polarization) | 1.08 × 10$^{24}$ m$^{-3}$ | 9.35 × 10$^{22}$ m$^{-3}$ |
| Polarized optical oscillator strength | 5.3 × 10$^{-6}$ (E ∥ c) | 2 × 10$^{-7}$ (E ∥ D$_2$) |
| $f_{31}$ Virtual cavity model Real cavity model | 1.4 × 10$^{-5}$ (E ∥ c) | |
| Optical dipole moment $\mu_{31}$ Virtual cavity model Real cavity model | 6.4 × 10$^{-32}$ C m 1.1 × 10$^{-31}$ C m | 2.13 × 10$^{-32}$ C m |
| Spin dipole moment $\mu_{12}$ | 17.6 GHz/T (B ∥ c, B$_{ac}$ ∥ c) | 35.5 GHz/T (B ⊥ b & 29° to D$_1$, Bac ∥ c) |
| $\Gamma_{ih}$ (optical) | 200 MHz | 500 MHz |
| $\Gamma_{ih}$ (spin) | 0.13 MHz | 1 MHz |

Figure 3:
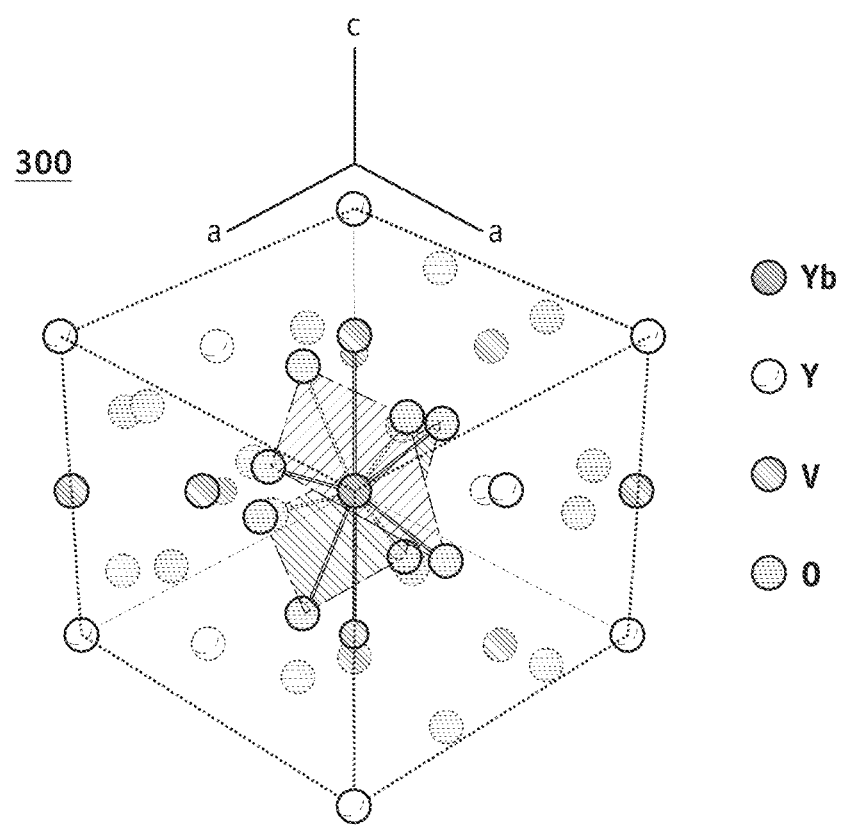
FIG. 3 shows a unit cell of a doped crystal ($^{171}Yb^{3+}$:YVO) comprising a ytterbium 171 ($^{171}Yb^{3+}$) ion doped into an yttrium orthovanadate (YVO) host crystal.

FIG. 3 shows a unit cell (300) of a doped crystal ($^{171}Yb^{3+}$:YVO) comprising a ytterbium 171 ($^{171}Yb^{3+}$) ion doped into an yttrium orthovanadate (YVO) host crystal. As can be seen in FIG. 3, a $^{171}YB^{3+}$ ion (denoted as Yb in FIG. 3) has substituted for a central Y$^{3+}$ ion (denoted as Y in FIG. 3) of the unit cell (300). It is noted that Yttrium orthovanadate (YVO) is a uniaxial crystal in which the Y$^{3+}$ ion sits at a site of D$_{2d}$ symmetry. In FIG. 3 the two orthogonal trapezoids (shown as shaded in FIG. 3) that connect the nearest 8 O$^{2-}$ ions (denoted as O in FIG. 3) give a guide to the eye for visualizing the D$_{2d}$ symmetry. Importantly, the space point group D$_{2d}$ is non-polar, which means that substitutional Yb$^{3+}$ ions in this site, as used in the M2O transducer according to the present disclosure, have zero first order sensitivity to electric fields.

FIG. 4 shows an energy level diagram of $^{171}Yb^{3+}$ ions doped into the YVO crystal structure shown in FIG. 3 as function of zero and near-zero applied magnetic fields (denoted as B$_{ext}$ in FIG. 4). In particular, transitions A, B, D, E and I are polarized along the c axis of the crystal shown in FIG. 3, and transitions $C_1$, $C_2$, $F_1$, $F_2$, $G_3$, $G_4$, $H_3$ and $H_4$, are polarized perpendicular to the c axis. Furthermore, transitions A, E and I, as well as transitions $C_1$, $C_2$, $F_1$, $F_2$, $G_3$, $G_4$, $H_3$ and $H_4$, are allowed at zero applied magnetic field (e.g., $B_{ext}$).

With continued reference to FIG. 4, it is noted that the $^{171}Yb^{3+}$ ion has 13 electrons in the 4f shell, which yields in the relatively simple electronic energy level structure (it is effectively a one-hole system) shown in FIG. 4. The degeneracy of the two spin-orbit manifolds $^2F_{7/2}$ (ground states, g for ground) and $^2F_{5/2}$ (excited states, e for excited) is lifted by the $D_{2d}$-symmetric crystal field interaction. Operation of the M2O transducer according to the present teachings is mainly based on the lowest lying energy levels of two multiplets, denoted in FIG. 4 as $^2F_{7/2}$ (0) and $^2F_{5/2}$(0). Only $^2F_{7/2}$(0) is thermally populated at liquid helium temperatures because it is separated from the next crystal field levels by >200 cm$^{-1}$ (>6 THz).

With further reference to FIG. 4, the $^{171}Yb^{3+}$ ion has a nuclear spin of ½, which interacts with the ion electron spin to partially lift the remaining degeneracy at zero field. The M2O transducer according to the present disclosure may transduce microwave photons using the excited states $|1\rangle_e \leftrightarrow |2\rangle_e$ or the ground states $|3\rangle_g \leftrightarrow |4\rangle_g$ spin transitions, which have large transition strengths (the dipole moment is of the order of electron spins) for ac-magnetic fields applied along the crystal c axis. This is despite the states involved being hybridized electron spin-nuclear spin states. When an external magnetic field (e.g., Bext of FIG. 4) is applied, the remaining degeneracy is lifted, and transitions B and D shown in FIG. 4 become allowed because of the mixing between the hyperfine states.

Transduction provided by the M2O transducer according to the present disclosure may be based on one of two different schemes, namely, a three-level scheme described with reference to FIGS. 5A-5C or a four-level scheme described with reference to FIGS. 6A-6B. Transduction according to the three-level scheme may be provided by applying a small (external) magnetic field (e.g., near-zero applied magnetic field) along the c axis of the doped ($^{171}Yb^{3+}$:YVO) crystal structure (e.g., as shown in the configuration of FIG. 1A described above). On the other hand, transduction according to the four-level scheme overcomes the need for applying the small magnetic field. In both the three-level and the four-level schemes, operation of the M2O transducer according to the present teachings may be provided by transduction of microwave photons coupled to the spin transition in the optical excited states of the $^{171}Yb^{3+}$ ions (e.g., denoted by e in FIG. 4), and the transduced optical output field (signal) may be the highest frequency optical transition. Accordingly, the M2O transducer of the present teachings may benefit from decreased parasitic loss and dephasing due to coupling with spectator-ion ensembles (e.g., Ref. [26]). Furthermore, it is noted that transduction based on the three-level or the four-level schemes may also be provided by ground state spin transitions of the $^{171}Yb^{3+}$ ions (e.g., denoted by g in FIG. 4) and the lowest frequency optical transition for the transduced optical output field.

FIG. 5A shows generic energy levels (transitions) according to two different implementations of a three-level transduction scheme (denoted by a V-system and Λ-system) that may be used in the M2O transducer according to the present disclosure. As shown in FIG. 5A, for both the V-system and the Λ-system, M2O transduction of a microwave signal (e.g., a microwave photon) at a frequency $f_M$ to an optical signal (e.g., optical photon) at a frequency $f_t$ can be provided through the application of a strong optical pump signal at a frequency $f_O$. Likewise, for both the V-system and the Λ-system, O2M transduction of an optical signal (e.g., an optical photon) at a frequency $f_t$ to a microwave signal (e.g., microwave photon) at a frequency $f_M$ can be provided through the application of a strong optical pump signal at a frequency $f_O$. As can be clearly understood by a person skilled in the art, difference between the V-system and the Λ-system being the state of the spin transition considered, for example considering the M2O transduction, in the V-system, the microwave signal, $f_M$, couples to the excited state spin transition (e.g., $|e_1\rangle$-$|e_2\rangle$) of the transduced optical signal, $f_T$, whereas in the Λ-system, the microwave signal, $f_M$, couples to the ground state spin transition (e.g., $|g_1\rangle$-$|g_2\rangle$) of the transduced optical signal, $f_T$.

FIG. 5B shows graphs representative of transduced signals from the M2O (or O2M) transducer according to the present disclosure as a function of an optical pump frequency (e.g., $\Delta_{optical}$ in GHz) for zero and near-zero applied magnetic fields (denoted $B_{ext}$ in FIG. 5B). It should be noted that the optical pump frequency, $f_O$, denoted in FIGS. 5B (and FIG. 5C) as $\Delta_{optical}$, is given/represented as a detuning/difference frequency, in GHz, from a frequency of the optical transition A of the $^{171}Yb^{3+}$ ions shown in FIG. 4. As can be seen in FIG. 5B, at zero applied magnetic field (e.g., 0.46 mT), the optical transitions B and D of the $^{171}Yb^{3+}$ ions (e.g., shown in FIG. 4) are forbidden, and therefore no transduction occurs as FIG. 5B shows no peaks in the transduced signal. On the other hand, for near-zero applied magnetic fields (e.g., 5.10-15.93 mT shown in FIG. 5B) the optical transitions B and D of the $^{171}Yb^{3+}$ ions described above with reference to FIG. 4 become allowed (e.g., two peaks of about 22 dB above the noise floor shown in FIG. 5B) and two V-systems specific to the $^{171}Yb^{3+}$ ions are thereby formed as shown in FIG. 5C (respectively using transition D and transition E as basis for the transduced signal). As can be seen in the graphs of FIG. 5B, the two V-systems are formed for applied magnetic fields including the range of about 5.10 to 15.93 mT, corresponding to a range of 3374 to 3415 MHz (i.e., 3.374-3.415 GHz per FIG. 5B) of the input microwave signal ($f_M$), therefore the applied magnetic field range may allow for the input microwave field to be tuned over a range of at least 41 MHz (e.g., 3415-3374 MHz).

FIG. 5C shows energy levels of two possible three-level transduction schemes used in the M2O transducer according to the present disclosure at near-zero applied magnetic fields. In the three-level transduction schemes shown in FIG. 5C, the coherence generated on the spin transition from excitation at a microwave frequency $f_M$ is mapped to an optical coherence at frequency $f_t$ through an optical pump field at frequency $f_O$. (e.g., denoted as an optical detuning $\Delta_{optical}$ from transition A in FIG. 5C). As noted above with reference to FIG. 5B, optical transitions B and D become allowed for near-zero magnetic fields, which can be used to form two V-systems and two Λ-systems. The two Λ-systems are illustrated in FIG. 5C. with one formed by the transitions D-$\{|1\rangle_e \leftrightarrow |2\rangle_e\}$-A and the other formed by the transitions E-$\{|1\rangle_e \leftrightarrow |2\rangle_e\}$-B. The two possible V-systems are formed by transitions A-$\{|3\rangle_g \leftrightarrow |4\rangle_g\}$-B and D-$\{|3\rangle_g \leftrightarrow |4\rangle_g\}$-E, respectively.

With continued reference to FIG. 5C, FIG. 5(b) shows example M2O transduction signals using the three-level strategy as function of laser excitation frequency for different applied magnetic fields. Considering the top three-level transduction scheme of FIG. 5C which assumes presence of a near-zero applied magnetic field ($B_{ext}$), when the $^{171}$Yb$^{3+}$ ions are optically driven on transition A at an offset frequency $\Delta_{optical}$ around 0 GHz, microwave tones resonant with the excited state transition (e.g., $|1\rangle_e \leftrightarrow |2\rangle_e$) are transduced to optical photons (at the frequency $f_t$) emitted on the D transition. Likewise, considering the bottom three-level transduction scheme of FIG. 5C which also assumes presence of a near-zero applied magnetic field ($B_{ext}$), when the $^{171}$Yb$^{3+}$ ions are optically driven on transition B at an offset frequency $\Delta_{optical}$ around 0.675 GHz, microwave tones resonant with the excited state transition (e.g., $|1\rangle_e \leftrightarrow |2\rangle_e$) are transduced to optical photons (at the frequency $f_t$) emitted on the E transition.

It should be noted that without cavity enhancement the transduction signal provided by the three-level schemes described above with reference to FIG. 5C may be strongest for input microwave fields/signals that are resonant with the $^{171}$Yb$^{3+}$ ion transitions, whereas cavity coupling may allow high efficiency without necessary requiring resonance (e.g., Refs. [2, 27]). As the magnetic field increases, the transduced signal intensity varies as the dipole moments and inhomogeneity of the optical and spin transitions change.

It is noted that transduction according to the present disclosure allows for a high signal-to-noise ratio via optical heterodyne detection, which can overcome a low device photon-number efficiency $\eta = 1.2 \times 10^{-13}$. Given the characterization of the material (e.g., $^{171}$Yb$^{3+}$:YVO) used in the present transducer, temperature, and driving rates, an increase in transduction efficiency by a factor $\geq 3 \times 10^{12}$ may be provided by the cavity based configuration described above with referenced to FIGS. 2A-2B. That is, the same ensemble of $^{171}$Yb$^{3+}$ ions coupled to one-sided (one of the two cavity port is perfectly reflective, see FIG. 2B) microwave and optical resonators/cavities, each with a quality factor of $2 \times 10^4$, could perform at the $\eta > 0.3$ level. The dramatic increase in efficiency is possible because $\eta$ scales quadratically with the photon-ion coupling strength for $\eta \ll 1$ [20,21].

It is further noted that bandwidth of the transducer according to the present teachings was measured using pulsed M2O transduction measurements and was found to be limited by the spin transition inhomogeneity $\Lambda_{ih\ (spin)} = 130$ kHz. Such bandwidth performance may be considered similar to one of leading electro-optomechanical (e.g., Ref. [11]) transducers but lower than the megahertz-bandwidths demonstrated in other schemes (e.g., Ref. [7]), including REI based schemes (e.g., Refs. [20, 21]). It is noted that increase in bandwidth may be achieved by increasing $^{171}$Yb$^{3+}$ dopant concentration (e.g., 86 ppm and higher relative to the host crystal) within the host crystal (YVO) and/or strain applied to such crystal.

Figure 6B:
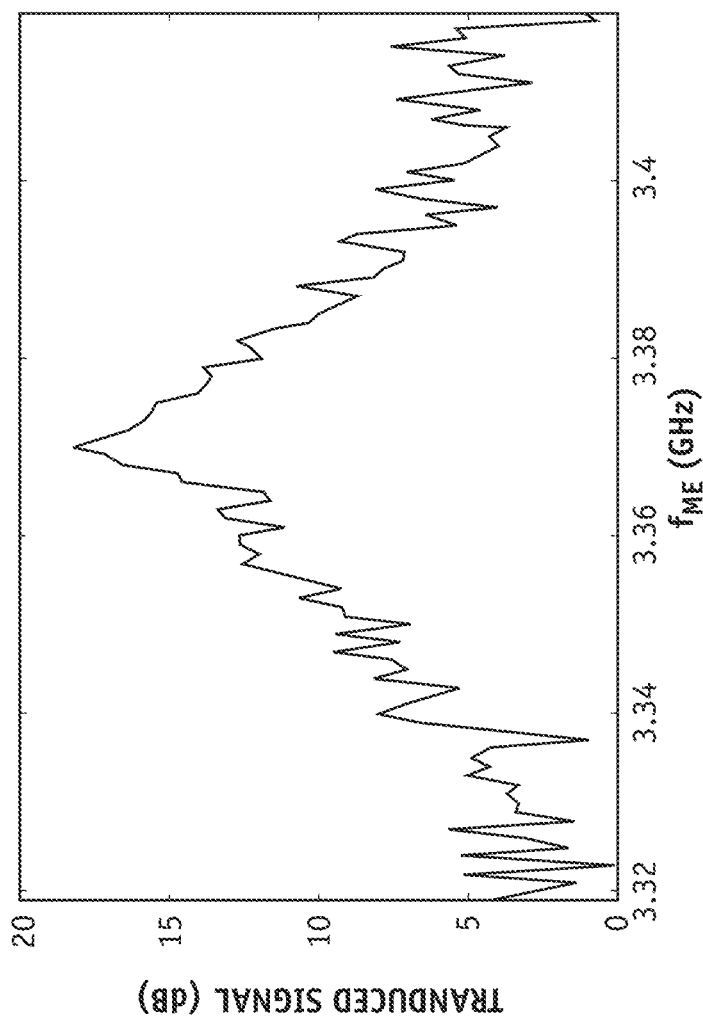
FIG. 6B shows a graph representative of transduced signals from the M2O transducer according to the present disclosure when operating according to the four-level transduction scheme at zero applied magnetic field.
Figure 6A:
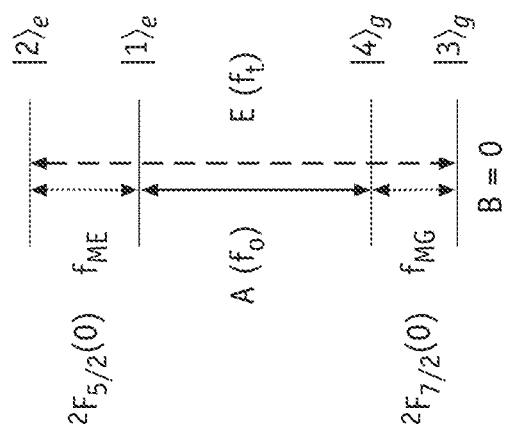
FIG. 6A shows energy levels according to a four-level transduction scheme at zero applied magnetic field used in the M2O transducer according to the present disclosure.

FIG. 6A shows energy levels according to a four-level transduction scheme at zero applied magnetic field used in the M2O transducer according to the present disclosure. As can be clearly taken from a person skilled in the art, the four-level transduction scheme of FIG. 6A uses transitions of the $^{171}$Yb$^{3+}$ ions of the crystal structure ($^{171}$Yb$^{3+}$:YVO) that are allowed at zero applied (external) magnetic field (e.g., with reference to FIG. 4). As shown in FIG. 6A, the four-level transduction scheme requires two separate microwave drive tones/signals ($f_{ME}$ and $f_{MG}$) instead of a single microwave drive tone/signal (e.g., $f_M$) required by the three-level transduction scheme described above with reference to FIGS. 5A-5C.

With continued reference to FIG. 6A, the input microwave signal to be transduced is at frequency $f_{ME}$ and two pump tones/signals are applied (simultaneously): one microwave pump tone at frequency $f_{MG}$, and one optical pump tone at frequency $f_O$ that is resonant with the optical transition A. The resultant transduced signal is produced at frequency $f_t$, which is resonant with optical transition E.

FIG. 6B shows a graph representative of the transduced signal by the M2O transducer according to the present disclosure when operating according to the four-level transduction scheme of FIG. 6A at zero applied magnetic field. In particular, the graph in FIG. 6B shows (power of) the optical output signal (transduced signal) referenced against the noise floor as a function of the input microwave frequency $f_{ME}$ (while $f_O$ is fixed on resonance with transition A, and $f_{MG}$ is resonant with transition $|3\rangle_g \leftrightarrow |4\rangle_g$ at about 675 MHz per FIG. 4). As can be clearly understood by a person skilled in the art, the transduced signal peaks when the input microwave frequency $f_{ME}$ is in resonance with the $|1\rangle_e \leftrightarrow |2\rangle_e$ transition in the excited state of the $^{171}$Yb$^{3+}$ ions (e.g., per FIG. 4)

It is noted that in the waveguide-based transducer according to the present disclosure (e.g., FIGS. 1A-1C), use of the four-level transduction scheme may be less efficient compared to use of the three-level transduction scheme and thus the four-level transduction may require increased laser power (e.g., $f_O$) to measure the transduced signal (e.g., $f_{ME}$). The resultant increase in device temperature may broaden the spin inhomogeneous linewidth, which in turn may further decrease the efficiency. Such reduction in efficiency may be overcome through the use of resonant cavities tuned to the relevant spin and optical transitions according to the configuration described above with reference to FIGS. 2A-2B.

An exemplary nonlimiting method for fabricating the M2O transducer described above with reference to FIGS. 1B and 1C may include: Cutting a sample to size for use as the base structure of the M2O transducer chip. The sample may be cut from an yttrium orthovanadate boule doped with isotopically enriched (95%) $^{171}$Yb$^{3+}$. For this, a $^{171}$Yb$^{3+}$ concentration of about 86 ppm relative to the host yttrium may be sufficient (e.g., measured by using glow discharge mass spectrometry). The sample size may be 3×3×0.5 mm and may be optionally polished. Following the chromium and gold deposition on a surface of the cut sample, a ZEP mask (as known to a person skilled in the art) may be defined by, for example, electron beam lithography. The sample may then be wet-etched in, for example, gold etchant, to form structures of the coplanar waveguide shown in FIG. 1B, including a 65 μm wide conductor centered between the two ground planes with the edge-to-edge distance (e.g., gaps per FIG. 1B) from conductor to ground plane equal to approximately 50 μm. Removing the resist (e.g., with Remover PG). Evaporating a 50 nm layer of chromium onto the sample configured as a hard mask. Milling the sample (e.g., milling using a Ga+ focused ion beam), to form an underlying structure for the nanophotonic optical waveguide as a suspended beam with an equilateral triangular cross section, with each side equal to approximately 1 μm (e.g., per FIG. 1C). In other words, the suspended beam is obtained by removing material from below the waveguide, thus forming a narrow structure fixed at either end but not supported from below, like a bridge. Furthermore, milling a distributed (Bragg) reflecting mirror into one end of the optical waveguide (e.g., Ref. [28]), along with at least one 45° optical coupler. Finally, removing the chromium layer using chrome etchant (e.g., CR-7). It is noted that most of these fabrication steps may equally apply to fabricate the cavity-based transducer described above with reference to FIGS. 2A-2B.

Figure 7:
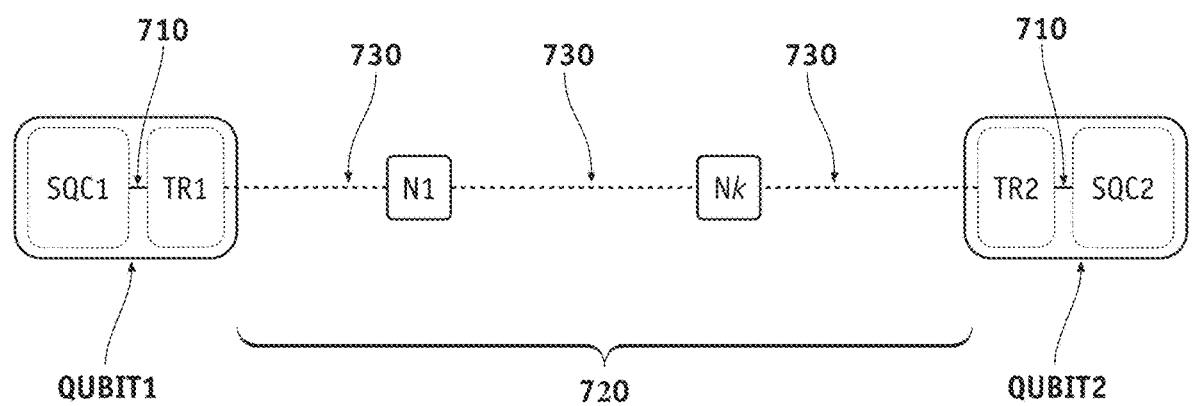
FIG. 7 shows a schematic of an exemplary optical quantum network comprising the M2O transducer according to the present disclosure.

FIG. 7 shows a schematic of an exemplary optical quantum network (700) comprising the M2O transducer according to the present disclosure. As known to a person skilled in the art, such network (700) may be used for entangling (i.e., connecting at the quantum level) a first qubit, Qubit1, at a first superconducting quantum computer (SQC1), to a second qubit, Qubit2, at a second superconducting quantum computer (SQC2), wherein (SQC1) and (SQC2) may be connected via quantum repeater nodes (720) (e.g., N1, . . . , Nk) over optical links (730). As shown in FIG. 7, each of the (SQC1) and (SQC2) may locally interface to respective transducers (TR1) and (TR2) according to the present disclosure over respective microwave links (710). It is noted that each such transducer (TR1, TR2) may operate either as a M2O or as a O2M.

It is further noted that performing transduction in quantum networks via the transducer according to the present teachings, such as one shown in FIG. 7, may enable quantum memories to be incorporated directly into the transducer to enable synchronization of network links. As known to a person skilled in the art, such memories may be included in any of the constituent network elements shown in FIG. 7. The coherence lifetime of the spin transitions of the $^{171}Yb^{3+}$ ions as used in the present transducer, which sets an upper bound on a potential storage time, is found to be sufficiently long to enable useful storage relative to the timescales of typical microwave qubit operations (e.g., 10-100 ns as implemented, for example, in current superconducting quantum computers).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

1. Wehner, S., Elkouss, D. & Hanson, R. Quantum internet: A vision for the road ahead. *Science* (80-.). 362, eaam9288 (2018).
2. Williamson, L. A., Chen, Y.-H. & Longdell, J. J. Magneto-optic modulator with unit quantum efficiency. *Phys. Rev. Lett.* 113, 1-5 (2014).
3. O'Brien, C., Lauk, N., Blum, S., Morigi, G. & Fleischhauer, M. Interfacing superconducting qubits and telecom photons via a rare-earth-doped crystal. *Phys. Rev. Lett.* 113, 1-5 (2014).
4. Ortu, A. et al. Simultaneous coherence enhancement of optical and microwave transitions in solid-state electronic spins. *Nat. Mater.* 17, 671-675 (2018).
5. Kindem, J. M. et al. Coherent control and single-shot readout of a rare-earth ion embedded in a nanophotonic cavity. *Arxiv Prepr. arXiv*1907.12161 (2019).
6. Lambert, N. J., Rueda, A., Sedlmeir, F. & Schwefel, H. G. L. Coherent Conversion Between Microwave and Optical Photons—An Overview of Physical Implementations. *Adv. Quantum Technol.* 3, 1900077 (2020).
7. Lauk, N. et al. Perspectives on quantum transduction. *Quantum Sci. Technol.* 5, 020501 (2020).
8. Rueda, A. et al. Efficient microwave to optical photon conversion: an electro-optical realization. *Optica* 3, 597 (2016).
9. Fan, L. et al. Superconducting cavity electro-optics: A platform for coherent photon conversion between superconducting and photonic circuits. *Sci. Adv.* 4, eaar4994 (2018).
10. Andrews, R. W. et al. Bidirectional and efficient conversion between microwave and optical light. *Nat. Phys.* 10, 321-326 (2014).
11. Higginbotham, A. P. et al. Harnessing electro-optic correlations in an efficient mechanical converter. *Nat. Phys.* 14, 1038-1042 (2018).
12. Vainsencher, A., Satzinger, K. J., Peairs, G. A. & Cleland, A. N. Bi-directional conversion between microwave and optical frequencies in a piezoelectric optomechanical device. *Appl. Phys. Lett.* 109, 033107 (2016).
13. Dahmani, Y. D., Sarabalis, C. J., Jiang, W., Mayor, F. M. & Safavi-Naeini, A. H. Piezoelectric Transduction of a Wavelength-Scale Mechanical Waveguide. *Phys. Rev. Appl.* 13, 024069 (2020).
14. Hisatomi, R. et al. Bidirectional conversion between microwave and light via ferromagnetic magnons. *Phys. Rev. B* 93, 174427 (2016).
15. Ledingham, P. M., Naylor, W. R. & Longdell, J. J. Experimental Realization of Light with Time-Separated Correlations by Rephasing Amplified Spontaneous Emission. *Phys. Rev. Lett.* 109, 093602 (2012).
16. Dibos, A. M., Raha, M., Phenicie, C. M. & Thompson, J. D. Atomic Source of Single Photons in the Telecom Band. *Phys. Rev. Lett.* 120, 243601 (2018).
17. Hedges, M. P., Longdell, J. J., Li, Y. & Sellars, M. J. Supplementary Information: Efficient quantum memory for light. *Nature* 465, 1052-1056 (2010).
18. G\"{u}ndo\u{g}an, M., Ledingham, P. M., Kutluer, K., Mazzera, M. & de Riedmatten, H. Solid State Spin-Wave Quantum Memory for Time-Bin Qubits. *Phys. Rev. Lett.* 114, 230501 (2015).

19. Jobez, P. et al. Coherent Spin Control at the Quantum Level in an Ensemble-Based Optical Memory. *Phys. Rev. Lett.* 114, 230502 (2015).
20. Fernandez-Gonzalvo, X., Chen, Y.-H., Yin, C., Rogge, S. & Longdell, J. J. Coherent frequency up-conversion of microwaves to the optical telecommunications band in an Er:YSO crystal. *Phys. Rev. A* 92, 062313 (2015).
21. Fernandez-Gonzalvo, X., Horvath, S. P., Chen, Y.-H. & Longdell, J. J. Cavity-enhanced Raman heterodyne spectroscopy in Er3+:Y2SiO5. *Phys. Rev. A* 100, 033807 (2019).
22. Chen, Y.-H., Fernandez-Gonzalvo, X. & Longdell, J. J. Coupling erbium spins to a three-dimensional superconducting cavity at zero magnetic field. *Phys. Rev. B—Condens. Matter Mater. Phys.* 94, 1-5 (2016).
23. Kindem, J. M. et al. Characterization of $^{171}$Yb3+:YVO4 for photonic quantum technologies. *Phys. Rev. B* 98, 024404 (2018).
24. Schuurmans, F. J. P., Vries, P. de & Lagendijk, A. Local-field effects on spontaneous emission of impurity atoms in homogeneous dielectrics. *Phys. Lett. A* 264, 472-477 (2000).
25. Dung, H. T., Buhmann, S. Y. & Welsch, D.-G. Local-field correction to the spontaneous decay rate of atoms embedded in bodies of finite size. *Phys. Rev. A* 74, 023803 (2006).
26. Welinski, S. et al. Electron Spin Coherences in Rare-Earth Optically Excited States for Microwave to Optical Quantum Transducers. *Phys. Rev. Lett.* 122, 247401 (2018).
27. Fernandez-Gonzalvo, X. Coherent Frequency Conversion from Microwave to Optical Fields in an Erbium Doped Y2SiO5 Crystal: Towards the Single Photon Regime. (University of Otago, 2017).
28. Zhong, T., Rochman, J., Kindem, J. M., Miyazono, E. & Faraon, A. High quality factor nanophotonic resonators in bulk rare-earth doped crystals. *Opt. Express* 24, 536 (2016).
29. Dold, G. et al. High-Cooperativity Coupling of a Rare-Earth Spin Ensemble to a Superconducting Resonator Using Yttrium Orthosilicate as a Substrate. *Phys. Rev. Appl.* 10, 54082 (2019).
30. Covey, J. P., Sipahigil, A. & Saffman, M. Microwave-to-optical conversion via four-wave mixing in a cold ytterbium ensemble. *Phys. Rev. A* 100, 012307 (2019).
31. Fernandez-Gonzalvo, X., Horvath, S. P., Chen, Y.-H. & Longdell, J. J. Cavity enhanced Raman heterodyne spectroscopy in Er3+:Y2SiO5 for microwave to optical signal conversion. *Arxiv* (2017).

The invention claimed is:

1. A transducer chip, comprising:
a substrate made of a doped crystal ($^{171}$Yb$^{3+}$:YVO) comprising ytterbium 171 ($^{171}$Yb$^{3+}$) ions doped into a yttrium orthovanadate (YVO) host crystal;
an optical structure formed in the substrate;
a conductive layer atop the substrate, the conductive layer comprising a microwave structure configured to magnetically couple a microwave signal to the optical structure,
wherein:
the transducer chip is configured to transduce the microwave signal to an optical signal by optical pumping energy levels of the $^{171}$Yb$^{3+}$ ions via an optical pump signal input to the optical structure to obtain a transduced optical signal output by the optical structure.

2. The transducer chip of claim 1, wherein transduction of the transducer chip is reversible.

3. The transducer chip of claim 1, wherein transduction of the transducer chip is according to a three-level scheme at near-zero applied external DC magnetic field.

4. The transducer chip of claim 3, the near-zero applied external DC magnetic field is smaller than 20 mT.

5. The transducer chip of claim 4, wherein the near-zero applied external DC magnetic field is in a range from about 5 mT to about 15 mT.

6. The transducer chip of claim 1, wherein transduction of the transducer chip is according to a four-level scheme at zero applied external DC magnetic field.

7. The transducer chip of claim 6, wherein transduction further comprises microwave pumping of the of the energy levels of the $^{171}$Yb$^{3+}$ ions via a microwave pump signal input to the microwave structure.

8. The transducer chip of claim 1, wherein the optical structure comprises:
an optical coupler at an input end of a longitudinal extension of the optical structure; and
a photonic crystal mirror at an opposite end of the longitudinal extension.

9. The transducer chip of claim 8, wherein:
the optical structure is an optical waveguide, and
the microwave structure is a microwave waveguide.

10. The transducer chip of claim 9, wherein a material of the conductive layer comprises gold.

11. The transducer chip of claim 9, wherein:
the microwave waveguide comprises a center signal line separated from adjacent ground planes through two gap regions formed in the conductive layer, and
the optical waveguide is formed in a gap region of the two gap regions.

12. The transducer chip of claim 11, wherein:
the gap region corresponds to a constricted region of the microwave waveguide.

13. The transducer chip of claim 8, wherein the optical structure further comprises:
a partially reflective photonic crystal mirror at the input end of the longitudinal extension of the optical structure so to form an optical resonant cavity.

14. The transducer chip of claim 13, wherein the microwave structure is a microwave resonant cavity.

15. The transducer chip of claim 14, wherein a material of the conductive layer comprises a superconductor.

16. The transducer chip of claim 14, wherein the microwave resonant cavity is a planar lumped-element microwave resonator.

17. The transducer chip of claim 16, wherein the planar lumped-element microwave resonator comprises a meandering pattern formed in the conductive layer.

18. The transducer chip of claim 17, wherein:
the meandering pattern comprises conductive segments and gap regions separating the conductive segments, and
the optical resonant cavity is formed in a gap region separating two conductive segments.

19. The transducer chip of claim 1, wherein the substrate has a size of about 3×3×0.5 mm.

20. A quantum network comprising:
a superconducting quantum network; and
a transducer chip according to claim 1,
wherein the transducer chip is configured to reversibly map quantum information of a qubit between a microwave field of the superconducting quantum network and an optical field of optical links of the quantum network.

21. A method for realizing a rare-earth based transducer, the method comprising:
- providing a substrate made of a doped crystal ($^{171}$Yb$^{3+}$:YVO) comprising ytterbium 171 ($^{171}$Yb$^{3+}$) ions doped into a yttrium orthovanadate (YVO) host crystal;
- fabricating an optical structure in the substrate;
- applying a conductive layer atop the substrate; and
- forming a microwave structure in the conductive layer, the microwave structure configured to magnetically couple a microwave signal to the optical structure,
- wherein the optical structure comprises:
  - an optical coupler at an input end of a longitudinal extension of the optical structure; and
  - a photonic crystal mirror at an opposite end of the longitudinal extension.

* * * * *